Patented Oct. 31, 1933

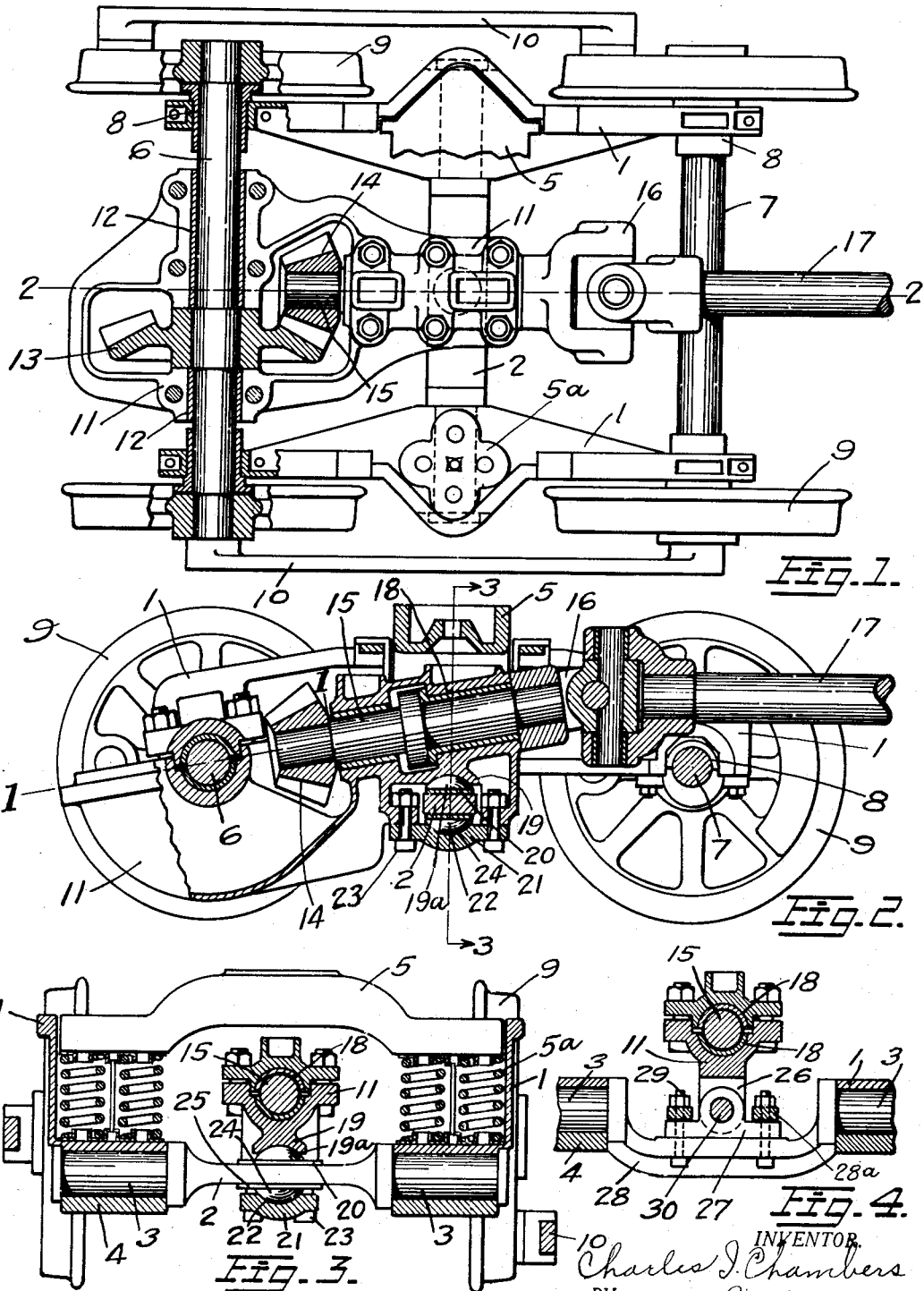

1,933,160

UNITED STATES PATENT OFFICE 1,933,160

GEARED TRUCK

Charles I. Chambers, Tacoma, Wash., assignor to Heisler Locomotive Works, Erie, Pa., a corporation of Pennsylvania Application March 7, 1931. Serial No. 520,777

4 Claims. (Cl. 105—118)

Geared trucks preferably have a frame that will yield in response to uneven conditions of track and due to this yielding and moving some flexibility is required in the mounting of the bearings which must be provided for carrying the gear shafts. The present invention is designed to simplify a mounting for this purpose and to improve such a mounting functionally so that it will more readily respond to variations in conditions. Features and details of the invention will appear from the specification and claims.

A preferred embodiment of the invention is illustrated in the accompanying drawing as follows:—

Fig. 1 shows a plan view of the truck with parts in section.

Fig. 2 a section on the line 2—2 in Fig. 1.

Fig. 3 a section on the line 3—3 in Fig. 2.

Fig. 4 a sectional view similar to Fig. 3 showing a modified construction.

The truck has side frames 1 and these are connected by a cross member 2, the cross member having trunnions 3 at their ends journaled in bearings 4 in the side frames. The truck is provided with the usual bolster 5 slidingly mounted on springs 5a.

Axles 6 and 7 are journaled in bearings 8 in the side frames and have wheels 9 fixed on their outer ends. The wheels are connected to rotate together by connecting rods 10 in the usual manner.

A bearing frame, or housing 11, has a journal bearing 12 which is journaled on the axle 6. A beveled gear 13 is fixed on the axle within the housing 11 and meshes with a beveled gear 14. The beveled gear 14 is fixed on a stub shaft 15 and the stub shaft is driven through a universal 16 by a longitudinal shaft 17 from a source of power (not shown) for the locomotive, or similar apparatus with which the truck is used. The stub shaft is provided with a bearing 18 in the housing, or bearing frame 11. This bearing frame is supported on the cross member 2. The bearing frame is provided with a cup 19 which engages a semi-ball 19a supported on a sliding plate 20, the plate sliding on the cross member 2. A cap 21 is arranged below the cross member. This cap has a cup 22 similar to the cup 19 and is secured to the bearing frame by bolts 23. A semi-ball 24 engages the cup surface and is secured to a sliding wearing plate 25. The semi-ball portions 19 and 24 form spherical surfaces with the same center. Consequently the connection between the bearing frame 11 and the cross piece readily flexes, slides and moves in response to the weaving and shifting of the truck frame.

In the modification shown in Fig. 4, the housing 11 has projecting ears 26 which extend over the bearing block 27. The bearing block is slidingly secured on a cross member 28 by caps 28a and bolts 29. A pivot pin 30 extends through the bearing block and the ears 26 making a pivotal connection between the bearing an dthe cross member, this pivotal connection having a longitudinal axis. This with the swinging freedom of the trunnions gives a universal joint effect which satisfies many of the strains to which the bearing frame is subjected.

What I claim as new is:—

1. In a geared truck, the combination of a main frame comprising sides and a cross member; a driving axle journaled in the frame; a driven gear on the axle; a driving gear meshing with the driven gear; a shaft on which the driving gear is mounted, said shaft extending at right angles to the axle; a bearing frame journaled on the axle and in which the shaft is journaled; and a universal bearing below the shaft and between the bearing frame and the cross member.

2. In a geared truck, the combination of a main frame comprising sides and a cross member; a driving axle journaled in the frame; a driven gear on the axle; a driving gear meshing with the driven gear; a shaft on which the driving gear is mounted, said shaft extending at right angles to the axle; a bearing frame journaled on the axle and in which the shaft is journaled; and a universal and sliding connection below the shaft and between the bearing frame and the cross member.

3. In a geared truck, the combination of a main frame comprising sides and a cross member; a driving axle journaled in the frame; a driven gear on the axle; a driving gear meshing with the driven gear; a shaft on which the driving gear is mounted; a bearing frame journaled on the axle and in which the shaft is journaled, said bearing frame having a cup above the cross member; a cup arranged below the cross member; and semi-balls on the cross member engaging the cups.

4. In a geared truck, the combination of a main frame comprising sides and a cross member; a driving axle journaled in the frame; a driven gear on the axle; a driving gear meshing with the driven gear; a shaft on which the driving gear is mounted; a bearing frame journaled on the axle and in which the shaft is journaled, said bearing frame having a cup above the cross member; a cup arranged below the cross member; and semi-balls slidingly mounted on the cross member engaging the cups.

CHARLES I. CHAMBERS.